(12) United States Patent
Roman et al.

(10) Patent No.: US 7,275,697 B2
(45) Date of Patent: Oct. 2, 2007

(54) THERMOSTATIC VALVE FOR A COOLING CIRCUIT

(75) Inventors: Jean-Michel Roman, Perthes en Gatinais (FR); Lionel Mabboux, Ste Genevieve des Bois (FR)

(73) Assignee: Vernet S.A., Arpajon Cedex (FR)

( * ) Notice: Subject to any disclaimer, the term of this patent is extended or adjusted under 35 U.S.C. 154(b) by 473 days.

(21) Appl. No.: 10/887,909

(22) Filed: Jul. 12, 2004

(65) Prior Publication Data

US 2006/0006247 A1  Jan. 12, 2006

(51) Int. Cl.
  *G05D 23/00* (2006.01)
  *F16K 1/00* (2006.01)
(52) U.S. Cl. .................. 236/93 R; 236/93 A; 137/861; 137/591
(58) Field of Classification Search ............. 236/93 R, 236/93 A; 165/41; 237/887, 861, 597; 137/867, 137/861, 597; 123/41.08, 41.29, 41.1, 41.12
See application file for complete search history.

(56) References Cited

U.S. PATENT DOCUMENTS 5,482,010 A  1/1996  Lemberger et al.
6,719,208 B2 *  4/2004  Brown .................. 236/34.5

FOREIGN PATENT DOCUMENTS

EP  0694681 A1  1/1996
FR  2601719  1/1988

\* cited by examiner

*Primary Examiner*—Chen Wen Jiang
(74) *Attorney, Agent, or Firm*—Wenderoth, Lind & Ponack, L.L.P.

(57) ABSTRACT

A valve comprises a housing, a movable check mechanism that is suitable for regulating passage of a fluid between an inlet orifice and an outlet orifice of the housing, a stationary seat for receiving the check mechanism, and a thermostatic element that is provided with a body, which contains an expandable material, and a movable piston, with this body being stationary relative to the housing. In order to prevent excessive pressure from being generated in the valve, on a side of the check mechanism where the thermostatic element is arranged, the check mechanism and the piston are connected by a part that is integral with the valve and delimits a blind recess for receiving the piston, with a base of the recess forming a stop for the piston when a difference in pressure on either side of the check mechanism is less than a predetermined value, while a wall of the recess forms a surface for sliding contact with the piston when this difference in pressure is greater than this predetermined value.

12 Claims, 8 Drawing Sheets

THERMOSTATIC VALVE FOR A COOLING CIRCUIT

TECHNICAL FIELD

The present invention relates to a thermostatic valve comprising an expandable-material thermostatic element that is suitable for controlling movements of a check mechanism for regulating passage of a fluid through the valve.

BACKGROUND TO THE INVENTION

In numerous applications in a field of fluids, in particular for cooling heat engines, valves of this type are used for distributing a fluid entering various tracts as a function of characteristics, in particular temperature characteristics, of this entering fluid.

In a currently used valve, a free end of a piston of a thermostatic element is often rigidly connected to a check mechanism regulating flow of fluid into the valve, such that a distance of the valve from its seat is controlled by development of temperature of the fluid in which the thermostatic element is immersed.

Some operating conditions of heat engines may cause excessive pressure in water cooling circuits, whilst a thermostatic valve is not opened by thermal stresses as temperatures are too low. This excessive pressure may be harmful to some components of these circuits.

U.S. Pat. No. 5,482,010 and EP-A-0 694 681 propose thermo-pressostatic devices that are intended to prevent excessively high pressure on a side of a check mechanism that is remote from that on which the check mechanism is connected to a piston of a thermostatic regulation element. These devices are thus applied only to valves that have at least three fluid inlet ports and are equipped with two check mechanisms. Any differences in pressure within these valves, caused by simultaneous thermostatic control of the two check mechanisms, are then corrected by pressostatic regulation of one of the check mechanisms, a "by-pass check mechanism" or "short-circuit check mechanism", which consists in pulling this check mechanism in an opposite direction to that controlled by expansion of wax of the thermostatic element. The valves described in the aforementioned documents do not, on the other hand, have any facilities for regulating an increase in pressure of fluid around the thermostatic element.

An object of the present invention is to propose a thermostatic valve that limits risks of damage in the event of pressure of fluid in the valve becoming excessively high, on a side of a regulating check mechanism on which this check mechanism is connected to a piston of a thermostatic element of the valve.

SUMMARY OF THE INVENTION

For this purpose, the invention relates to a thermostatic valve for a cooling circuit, in particular associated with a heat engine, comprising a main housing which forms an inlet orifice for a fluid and at least one outlet orifice for this fluid, a check mechanism that is movable relative to the housing and is suitable for regulating passage of the fluid between the inlet orifice and the outlet orifice, a seat, which is stationary relative to the housing, for receiving the check mechanism, and a thermostatic element that is provided with a body, which contains an expandable material, and with a piston that is movable relative to the body, with this body being stationary relative to the housing. The valve according to the invention further comprises a connecting piece between the check mechanism and the piston, which connecting piece is integral with the check mechanism and delimits a blind recess for receiving the piston, with a base of the recess forming a stop for the piston when a difference in pressure on either side of the check mechanism is less than a predetermined value, thus connecting the check mechanism and the piston to each other kinematically, while a wall of the recess forms a surface for sliding contact with the piston when this difference in pressure is greater than the predetermined value, thus allowing the check mechanism to be displaced relative to the piston, in a displacement direction of the piston.

When the pressure on a side of the check mechanism on which this check mechanism is connected to the piston of the thermostatic element becomes too great relative to the pressure on another side of the check mechanism, the connecting piece and, as a result, the check mechanism slide so as to distance the check mechanism from its seat, thereby facilitating or increasing flow of the fluid into the valve.

When this pressure differential falls back to a level that is tolerated by the valve, a resilient member may return the check mechanism, and therefore the connecting piece, toward its seat. If, on the other hand, pressure conditions of the fluid remain tolerable for these circuits, movements of the check mechanism are controlled by the piston of the thermostatic element, as with the valves of the prior art.

In accordance with other characteristics of this valve, taken individually or in any of technically possible combinations:

- the connecting piece is press-fitted into an interior crown of the check mechanism;
- the connecting piece is integral with a lower portion of the check mechanism;
- the valve comprises a spring for returning the check mechanism toward the seat, with the predetermined pressure value being a function of adjustment of this spring;
- the piston and the connecting piece delimit between them a free space for communication between the base of the blind recess and an exterior opening of this recess;
- the free space is partly delimited by a flat portion provided along the piston;
- the valve comprises a rigid stirrup, which delimits the seat for receiving the check mechanism and which is joined to the main housing, on the one hand, and to a body of the thermostatic element, on the other hand;
- the valve comprises a secondary housing, which is tightly connected to the main housing in a region of one of its inlet or outlet orifices, tightening a flange for connecting the stirrup;
- the valve comprises a lid, which is tightly connected to the main housing and is suitable for connecting a flange of the stirrup to the main housing;
- the body of the thermostatic element is arranged in the main housing, in a flow path of the fluid between the inlet orifice for this fluid and at least one of the outlet orifices for this fluid;
- the main housing delimits a tract for circulation of a fluid other than that which is regulated by the check mechanism, with the body of the thermostatic element being arranged in the main housing, in a path of this other fluid; and
- the valve comprises both an electrical heating device, which comprise a sheath that is at least partially immersed in the expandable material of the thermostatic element and a heating resistor that is accommodated in the sheath and is suitable for being connected to an electric power supply, and an added electrical connecting socket, which is suitable for positioning electrical connecting contacts of the heating resistor and is tightly joined to the sheath such that the thermostatic assembly, including the thermostatic element, the heating device and the electrical connecting socket, is in a pre-assembled configuration in which this assembly is capable of being fitted in one piece in the main housing.

BRIEF DESCRIPTION OF DRAWINGS

A better understanding of the invention will be facilitated by the following description, which is given solely by way of example and refers to the drawings, in which.

DETAILED DESCRIPTION OF PREFERRED EMBODIMENTS

Figure 1:
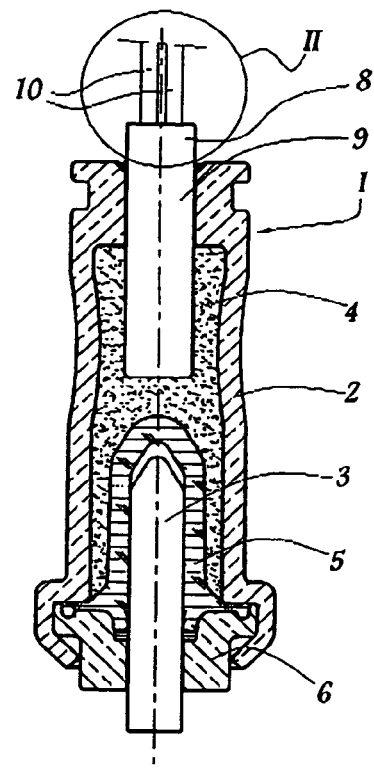
FIG. 1 is a schematic longitudinal sectional view of a conventional electrically controlled thermostatic element.

FIG. 1 shows a known thermostatic element, which has reference numeral 1 and is intended to be immersed into a fluid of variable temperature.

The thermostatic element 1 substantially comprises a body 2, which is made of a readily heat-conducting material, such as a metallic material, for example, and a piston 3, in the form of a rod that is movable relative to the body 2. The body 2 delimits on an inside an expandable-type reception cavity 4, which is generally made of wax and is tightly confined by an elastomer membrane 5, which is held firmly relative to the body 2 by a lid 6.

When temperature of the fluid in which the thermostatic element 1 is immersed increases, expansion of the wax 4 causes the piston 3 to be pulled in a longitudinal direction X-X of the thermostatic element. When the wax contracts, returning structure (not shown) is generally provided in order to bring the piston 3 back inside the body 2.

An electrical heating device 8 is provided to facilitate control in conjunction with or independently of the temperature of the fluid in which the thermostatic element 1 is immersed. The electrical heating device 8 is in the form of a rigid sheath 9 that passes right through a base of the body 2, which is remote from the lid 6, and is partially immersed in the wax 4. An electrical heating resistor, only electrical connecting contacts 10 of which are visible in FIG. 1A, is accommodated inside the sheath. It will be understood that when the heating resistor is supplied with current, the wax 4 dilates and the piston 3 is displaced.

Figure 2:
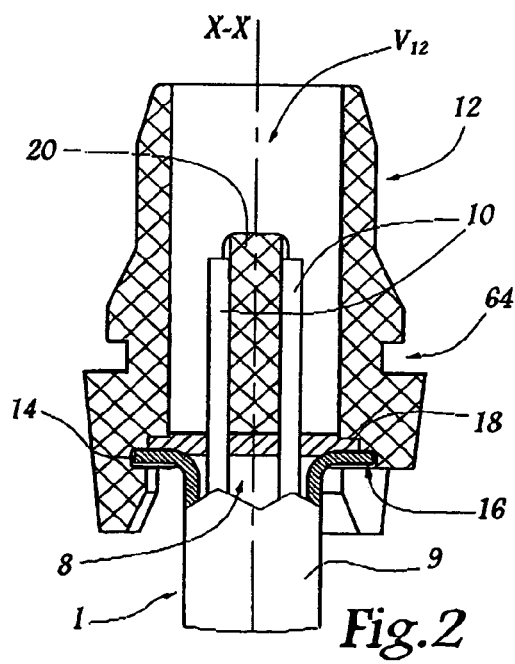
FIG. 2 is a view of a thermostatic element to which an electrical connecting socket has been added, in a region of ringed detail marked II in FIG. 1.
Figure 3:
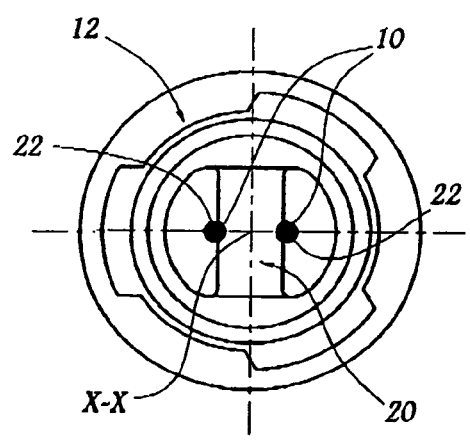
FIG. 3 is a plan view along arrow III marked in FIG. 2.

FIGS. 2 and 3 show an electrical connecting socket 12.

The socket 12 is in the form of a single-piece component, which is obtained, for example, by molding a plastic material, and which has a substantially tubular shape, a longitudinal axis of which is substantially coaxial with longitudinal axis X-X of the thermostatic element 1 when the socket is added to this element.

For this purpose, in this embodiment, a free end of the sheath 9 forms an annular collar 14, which is received in an annular groove 16 formed in an interior wall of the socket 12. A seal 18, fitted in a compressed state, is inserted between the collar and the socket.

The electrical connecting contacts 10 of the heating resistor, which are accommodated in the sheath 9, pass right through the seal 18, such that these contacts are arranged within volume $V_{12}$ of the socket. The contacts are positioned on either side of an interior support 20, which is formed by the socket 12. The support 20 extends longitudinally in a diametrical plane of the socket 12, connecting diametrically opposed interior wall portions, as shown in FIG. 3. A groove 22 for receiving the electrical connecting contacts 10 is formed in each side of the support 20, with a profile of these grooves 22 being suitable for holding the contacts, owing to a complementary nature of their shapes.

Figure 4:
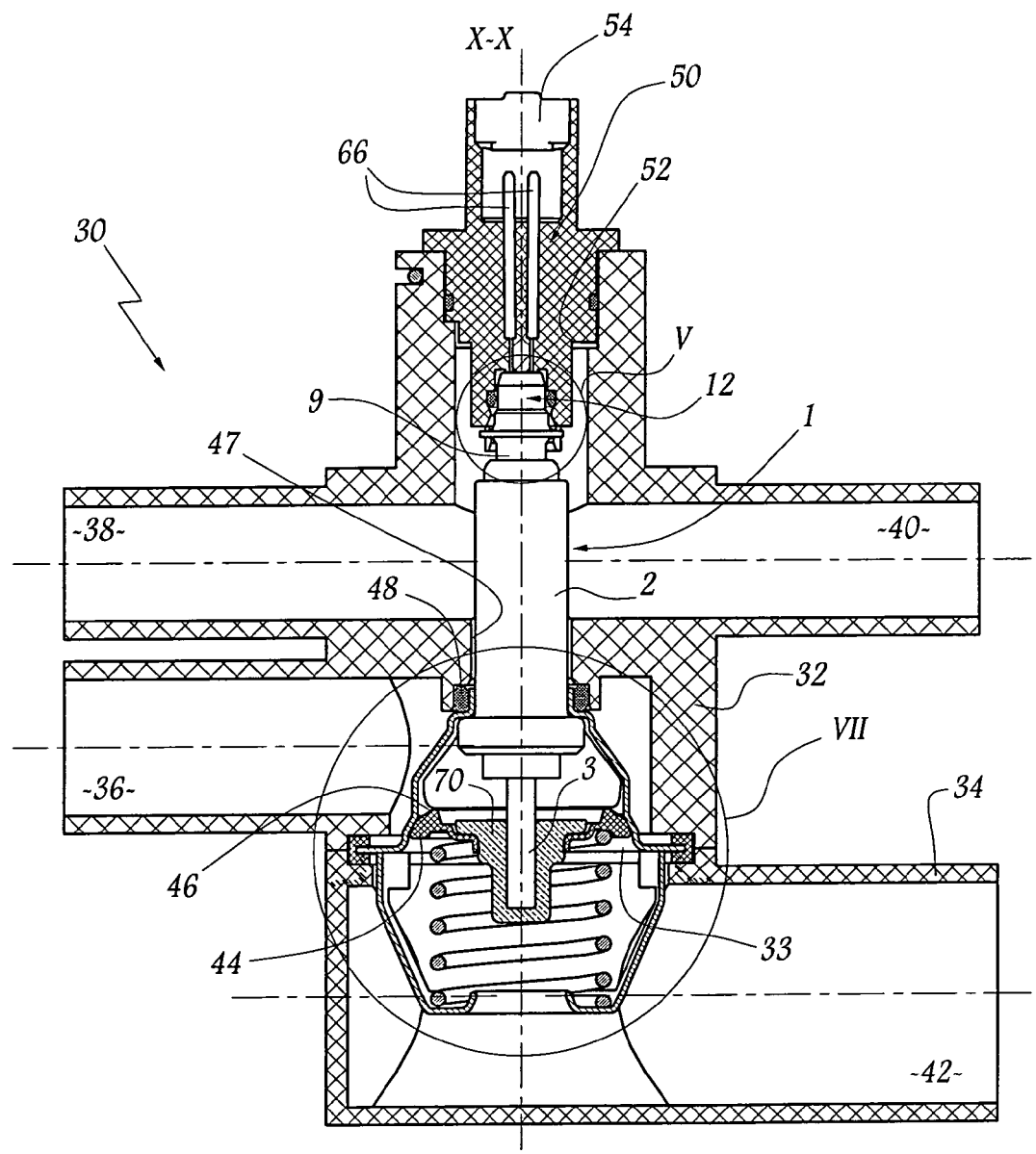
FIG. 4 is a schematic longitudinal sectional view of a thermostatic valve according to the invention, equipped with the thermostatic element and the socket from FIG. 2.

FIG. 4 shows a thermostatic valve 30 that is suitable for equipping a cooling circuit, in particular for a heat engine of a motor vehicle. This valve comprises a main housing 32 delimiting an orifice 33, in a region of which a secondary housing 34 is added in a tight manner. The housing 32 delimits three conduits, having reference numerals 36, 38 and 40. The secondary housing delimits a single conduit, having reference numeral 42. For example, if the valve 30 is used in a cooling circuit of a heat engine, the conduit 36 corresponds to a cold-water inlet that is intended to communicate, under some conditions explained below, and through the orifice 33, with the conduit 42, which forms a cold-water outlet in a direction of a heat exchanger. The conduit 38, for its part, forms an inlet for oil circulating in another tract of the cooling circuit, which inlet communicates freely with the conduit 40, which forms an outlet for this oil.

The valve 30 is equipped with structure for regulating a flow rate of water passing from inlet conduit 36 to outlet conduit 42 via the orifice 33, in the form of a closing check mechanism 44 associated with a corresponding seat 46. The check mechanism 44 is adapted to move away from or toward the seat 46, such that when the check mechanism bears against its seat, a flow rate of fluid passing from the conduit 36 to the conduit 42 is substantially zero, and when the check mechanism 44 is set completely apart from the seat 46, fluid feeding the conduit 36 passes virtually unimpeded into the outlet conduit 42.

In order to control displacement of the check mechanism 44 relative to the seat 46, the valve 30 is equipped with the thermostatic element 1, to which the connecting socket 12 is added. A major portion of the body 2 of the thermostatic element 1 is placed in flow of oil circulating from the inlet conduit 38 to the outlet conduit 40, while a remainder of the body 2 is received in an orifice 47 formed in a wall of the housing 32 separating water conduit 36 from oil conduits 38 and 40. A transverse section of the orifice 47 is substantially complementary to that of the body 2, and sealing structure 48 arranged around the body 2 prevents any fluid communication between an oil tract and a water tract.

Figure 5:
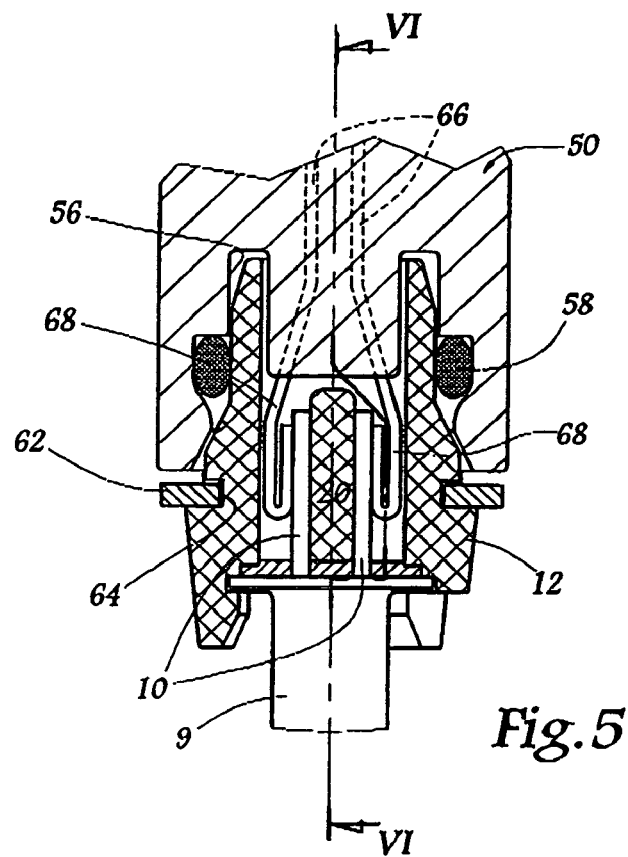
FIG. 5 is a larger-scale view of ringed detail marked V in FIG. 4.
Figure 6:
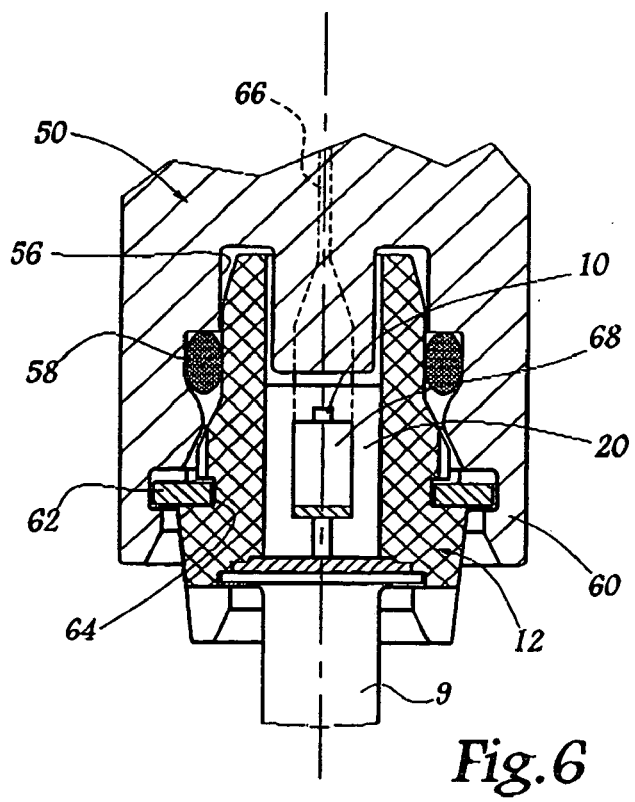
FIG. 6 is a sectional view taken along plane VI-VI marked in FIG. 5.

In order to supply the heating resistor of the heating device 8 with electric power and mechanically to maintain the connecting socket 12 and the sheath 9 of the thermostatic element 1, which is connected there opposite the housing 32, a connector 50 is tightly fixed in a complementary aperture 52 of the housing 32, which extends along the longitudinal axis X-X of the thermostatic element. In its portion turned toward an exterior of the housing, the connector 50 is provided with a cavity 54 for receiving an electrical power plug. In its opposite portion, the connector 50 caps the connecting socket 12, as shown in greater detail in FIGS. 5 and 6.

More precisely, the connector 50 forms a recess 56 for partially receiving the connecting socket 12, with an annular seal 58 being inserted between an exterior face of the socket and a wall of the connector delimiting this recess. The connector 50 is equipped with a plurality of flexible tongues 60 for connecting the socket, distributed over its periphery. These tongues are adapted to engage with a rigid annular insert 62, which is held axially relative to the socket in a corresponding peripheral groove (see FIG. 2) that is provided in an exterior wall of the socket.

A pair of electrical conductors 66, which extend from the cavity 54 for receiving an electrical power plug up to the recess 56 for receiving the socket, forming inside this recess resilient conductive pins 68 that are adapted to enter into contact with the contacts 10 of the heating resistor when the connector is fixed to the socket 12, run longitudinally along the connector 50.

Figure 7:
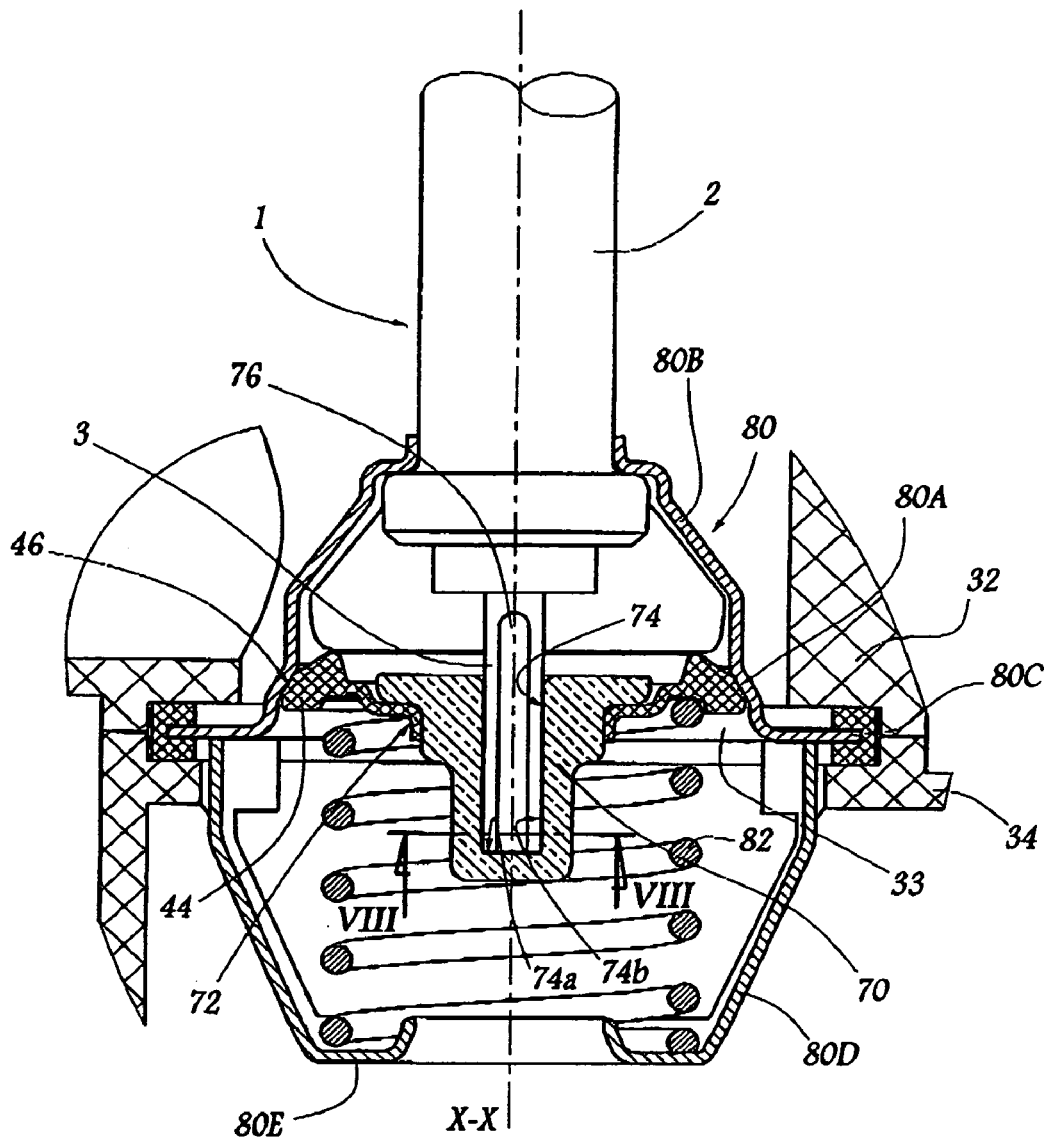
FIG. 7 is a larger-scale view of ringed detail marked VII in FIG. 4.

The piston 3 of the thermostatic element 1 is, for its part, connected to the check mechanism 44 of the valve 30 via a connecting piece 70. As shown in greater detail in FIG. 7, the connecting piece 70 is connected in translation along axis X-X to an interior crown 72 of the check mechanism 44. The connecting piece 70 is, for example, press-fitted into this crown. The connecting piece 70 and the check mechanism 44 are therefore connected kinematically to each other.

In its common portion, the connecting piece 70 has a blind hole 74 that is coaxial to the axis X-X and is adapted to receive a rod forming the piston 3 of the thermostatic element 1. A free end of the piston is adapted to bear against base 74a of the hole 74, so as to facilitate transmission, between this piston and the connecting piece 70, of a stress along axis X-X, directed away from the body 2.

Figure 8:
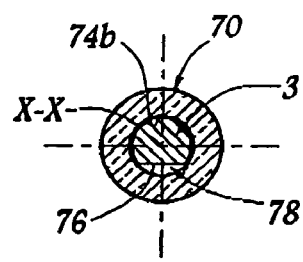
FIG. 8 is a sectional view taken along plane VIII-VIII marked in FIG. 7.

As shown in FIG. 8, the piston 3 has a flat portion 76, which, together with wall 74b of the hole 74, delimits a free space (reference numeral 78) that extends up to the free end of the piston. Contact between the piston 3 and the wall 74b is provided in a sliding manner, such that there is a degree of freedom in translation along axis X-X, between the piston and the connecting piece 70. In particular, when pressure in the water inlet conduit 36 is greater than that in the outlet conduit 40 by a predetermined value, a pressure differential exerted on the connecting piece 70 is able to cause this piece to slide relative to the piston, with the piston guiding movement of the connecting piece 70. In this configuration, shown in FIG. 9, a clearance (J) forms between a base of the hole 74 and the free end of the piston 3. The free space 78 provided in the flat portion 76 then allows fluid to be freely introduced into the clearance (J) thus formed, and prevents the connecting piece 70 from becoming immobilized by a suction effect on the piston 3 in the configuration of FIG. 7.

The valve 30 also comprises a stirrup 80, which delimits the seat 46 and which rigidly connects the body 2 of the thermostatic element 1 to the main housing 32 of the valve. More precisely, the stirrup 80 comprises an annular crown 80A, which defines the seat 46, branches 80B, which connect the body of the thermostatic element to the crown 80A, an annular flange 80C, which is held tightly between the housings 32 and 34, and branches 80D, which form at their free end supporter planes 80E for a return spring 82. This spring 82 is inserted between the check mechanism 44 and the stirrup 80, so as to return this check mechanism to its seat 46.

Between each of the branches 80B, openings allow fluid to pass from the inlet conduit 36 to a zone of the crown 80A. Similarly, the branches 80D define between them orifices allowing fluid to pass from the zone of the crown 80A toward the outlet conduit 40, when the check mechanism 44 is set apart from the seat 46.

The valve 30 is assembled as follows:

First, the connector 50 is joined to the housing 32 by being brought from outside the housing 32 into the aperture 52. The connector is joined to the housing in a tight manner by adhesion, by press-fitting or by clamping, for example.

A thermostatic assembly, formed by the thermostatic element 1 and the connecting socket 12 provided with the insert 62, and equipped with the check mechanism 44, the stirrup 80 and the spring 82, is then introduced into the housing 32, through the orifice 33. The connecting socket and the body 2 of the thermostatic element are introduced into the orifice 47 in a movement of translation along axis X-X, until free ends of the branches 80B compress the sealing member 48. The tongues 60 then engage with the insert 62 of the socket 12, and the pins 68 enter into electrical contact with the contacts 10.

The secondary housing 34 is then joined in a tight manner to the main housing 32, thus locking the flange 80C of the stirrup 80.

The fact that the electrical connecting socket is added to the thermostatic element before it is fitted in the valve allows a pre-assembled thermostatic assembly to be obtained that is easy to introduce into the housing 32, with no supplementary connection process being required in order to hold or position the connecting contacts of the electrical heating device relative to the housing. Moreover, electrical components of the assembly are insulated, at least in part, before the assembly is fitted in the valve, and insulation may therefore be tested prior to fitting. The connector 50 cooperates with the socket 12, to enable the thermostatic element to be supplied with electric power from outside the housing. The connector is easy to install, allowing the connecting contacts held by the socket to be electrically connected in a single step during fitting of the pre-assembled assembly, whilst at the same time ensuring complete tightness of the socket.

During operation, an oil tract, which enters via the conduit 38 and exits via the conduit 40, and a water tract, which enters via the conduit 36 and which may, depending on operating conditions of the valve, exit via the conduit 40, run along the valve 30. First of all, it shall be assumed that the valve 30 is in a configuration shown in FIG. 4, i.e. with the check mechanism 44 bearing tightly on the seat 46.

When temperature of the oil increases, the wax 4 contained in the body 2 of the thermostatic element 1 dilates, which causes the piston 3 to become displaced. The piston then pulls the connecting piece 70, and therefore the check mechanism 44, in translation along axis X-X. The conduits 36 and 42 are then set in communication. When the temperature of the oil decreases, the spring 82 returns the check mechanism 44 against its seat 46.

An electrical energy source, which is connected to the connector 50 via its cavity 54 for receiving a plug, may be controlled, independently or in conjunction with a temperature stress generated by the oil, in order to supply the heating resistor of the heating device 8 of the thermostatic element 1. Thus, once the contacts 10 have been supplied with electric power, the wax 4 dilates and causes the conduits 36 and 42 to be set in communication with each other, as above.

Furthermore, when pressure in the inlet conduit 36 is greater than pressure in the outlet conduit 40 by a predetermined value, as a function, in particular, of adjustment of the spring 82, a pressure differential causes the connecting piece 70, which then slides along the piston 3, pulling the check mechanism 44, to be pulled in translation, which sets the conduits 36 and 42 in communication with each other. The valve 30 thus prevents any damage to a water circuit resulting from excessive pressure.

Figure 9:
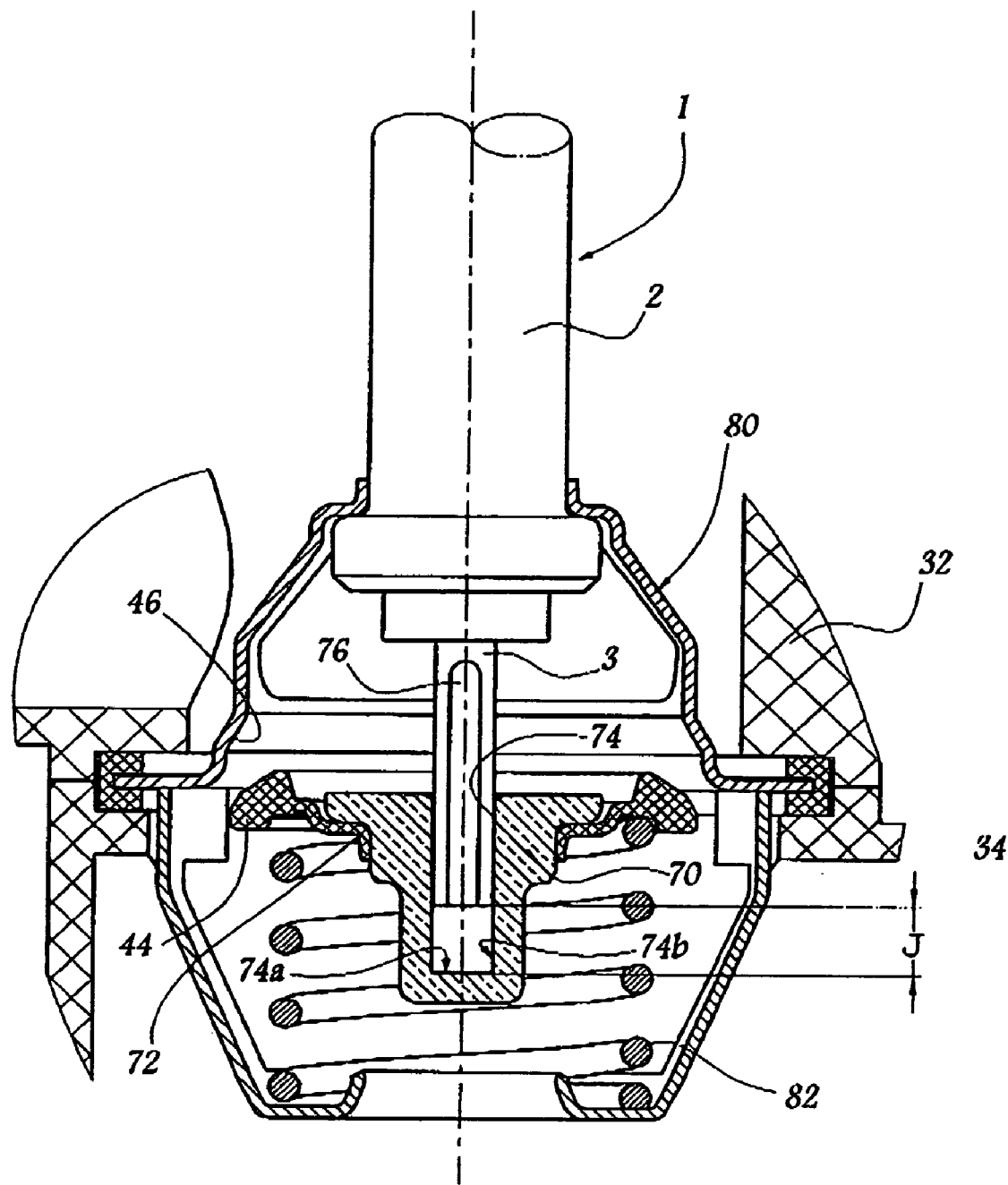
FIG. 9 is a similar view to FIG. 7, with the valve being shown in a different operating state.

In other words, the check mechanism 44 performs a thermo-pressostatic function, as illustrated in FIG. 9.

The flat portion 76 prevents both production of a clearance (J) if there is insufficient pressure between the connecting piece 70 and the piston 3, which might limit by a suction effect freedom of the piece to slide along the piston, and trapping of fluid in the clearance (J), which might prevent the piston from being returned rapidly and completely to the base of the hole 74 when the spring 82 returns the check mechanism 44, once the pressure differential has dropped back below the predetermined threshold value.

Figure 10:
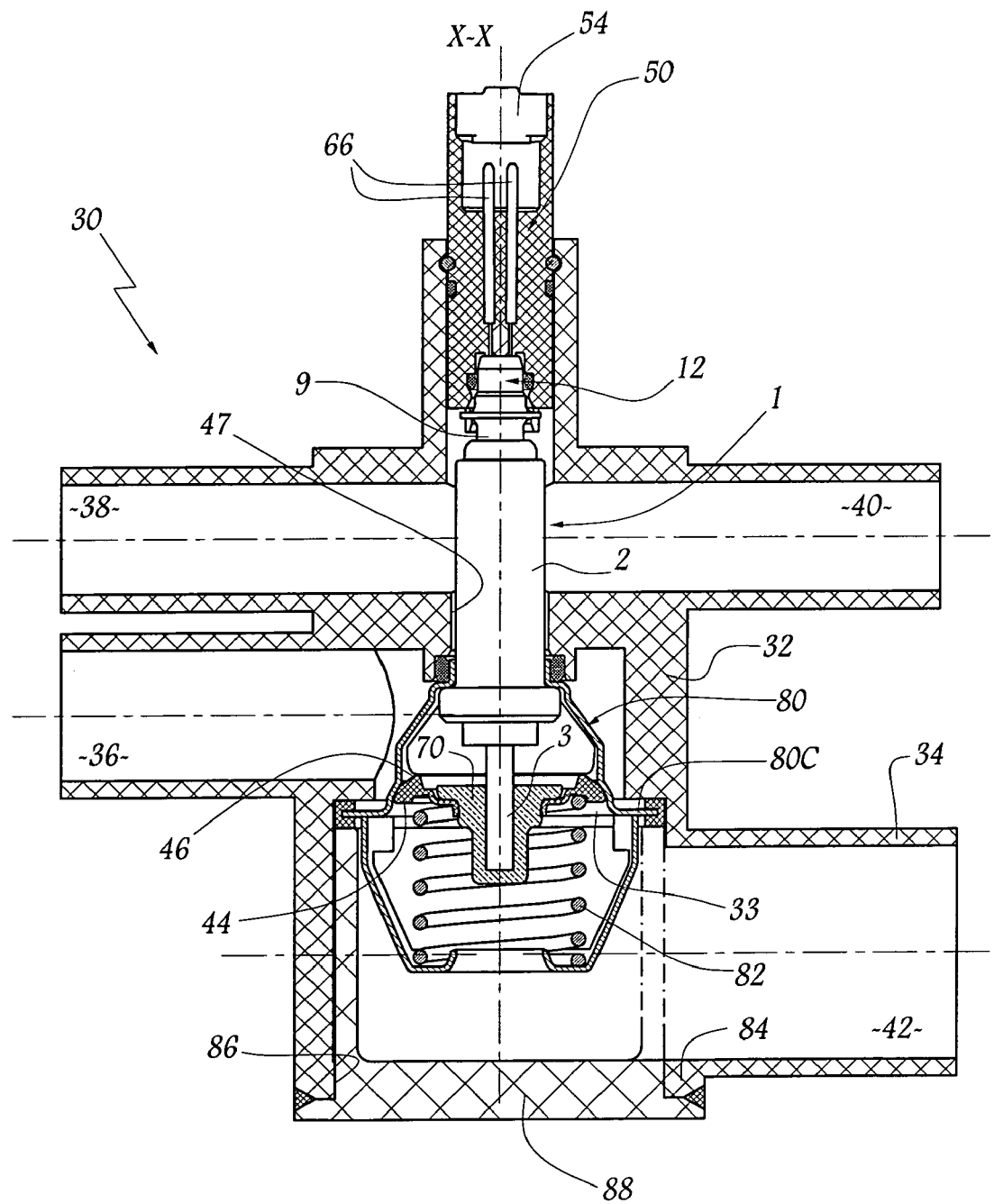
FIGS. 10 to 14 are similar views to FIG. 4, respectively showing variants of the thermostatic valve.
Figure 11:
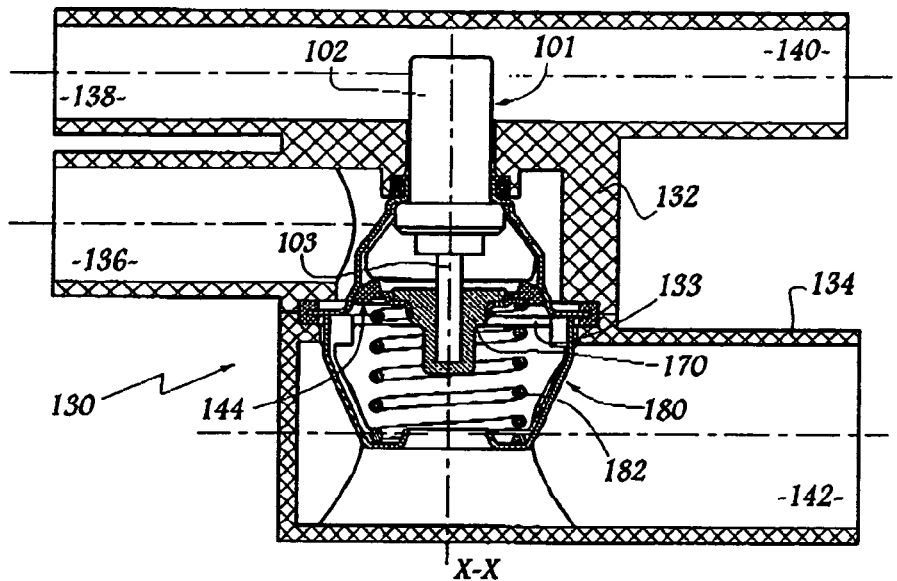

FIG. 10 shows a variant of the valve 30 that differs substantially from the valve of FIG. 4 owing to a shape of its main housing 32. The main housing forms the conduits 36, 38, 40 and 42 in a single piece. In order to facilitate installation of the thermostatic assembly comprising the element 1 and the socket 12, equipped with the check mechanism 44 and the stirrup 80, a wall of the housing that is remote from the aperture 52 has an aperture 86 that is substantially coaxial to the aperture 52. A lid 88 is also provided in order to close the aperture 86 in a tight manner, and in order to mechanically hold the flange 80C relative to the housing 32.

FIGS. 11 to 14 show other variants of thermostatic valves according to the invention, having reference numerals 130, 230, 330 and 430, respectively, with elements that these valves have in common with those of the valve 30 from FIG. 4 having the same reference numerals, increased by 100, 200, 300 and 400, respectively. The valve 130 of FIG. 11 differs substantially from the valve 30 owing to the fact that there is no electrical control of the thermostatic element 1. Also, element 101 is controlled solely by temperature of a fluid, in particular oil, tract circulating in the conduits 138 and 140.

Figure 12:
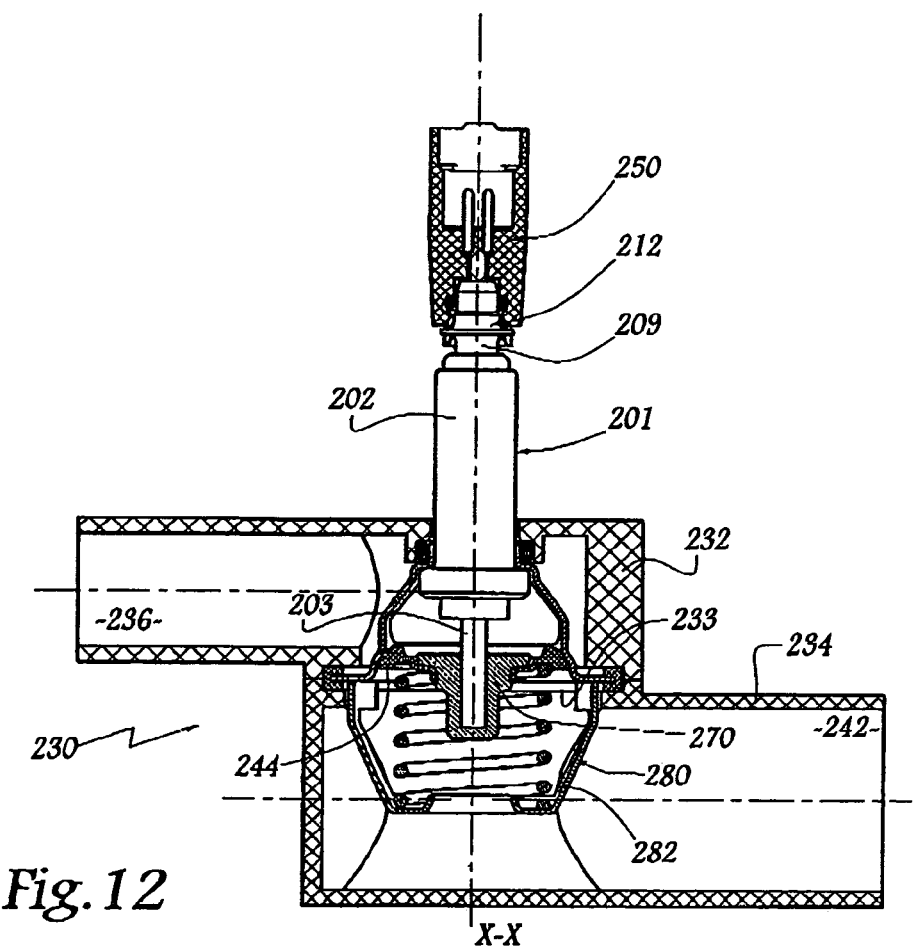

The valve 230 of FIG. 12 differs substantially from the valve 30 owing to the fact that thermostatic element 201 is not controlled by temperature of fluid in which body 202 of the element might be immersed. Movements of piston 203 are therefore controlled solely by the heating device 208, i.e. they are controlled electrically from outside the valve. Moreover, connector 250 is held mechanically only by socket 212, with the connector not being joined to housing 232.

Figure 13:
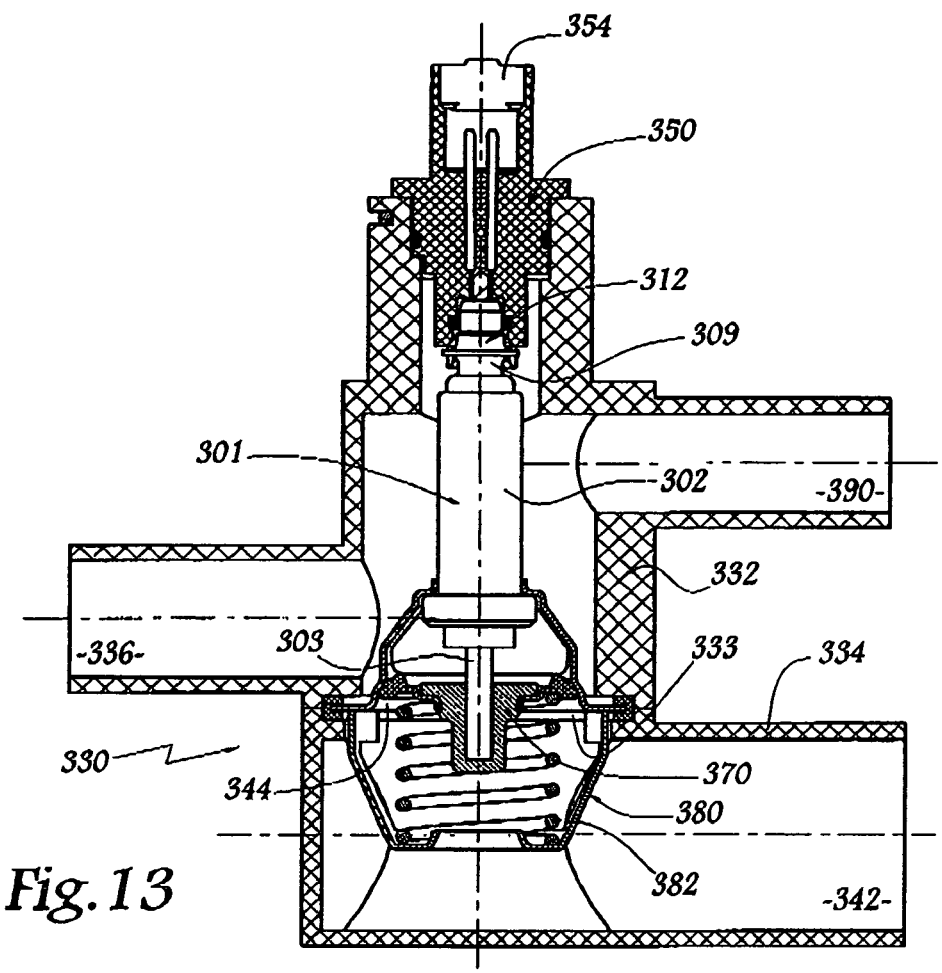

The valve 330 of FIG. 13 differs from the valve 30 of FIG. 4 owing to the fact that the oil inlet and outlet conduits are replaced by a second water outlet conduit 390, which communicates directly with inlet conduit 336, with body 302 of thermostatic element 301 being immersed in flow of fluid passing from the conduit 336 to conduit 390. The thermostatic element is therefore controlled by temperature of this fluid, and is also controlled electrically from connector 350. The valve 330 is, for example, used to distribute a cooling water flow rate at an outlet of a heat engine. The valve distributes this flow rate between conduit 342, on the one hand, which is intended to be connected to a cooling radiator, and conduit 390, on the other hand, which is intended to be connected to auxiliary exchangers, such as a cabin-heating unit heater or an oil/water heat exchanger. Assembly and operation of the valve 330 are substantially similar to those described for the valve 30.

Figure 14:
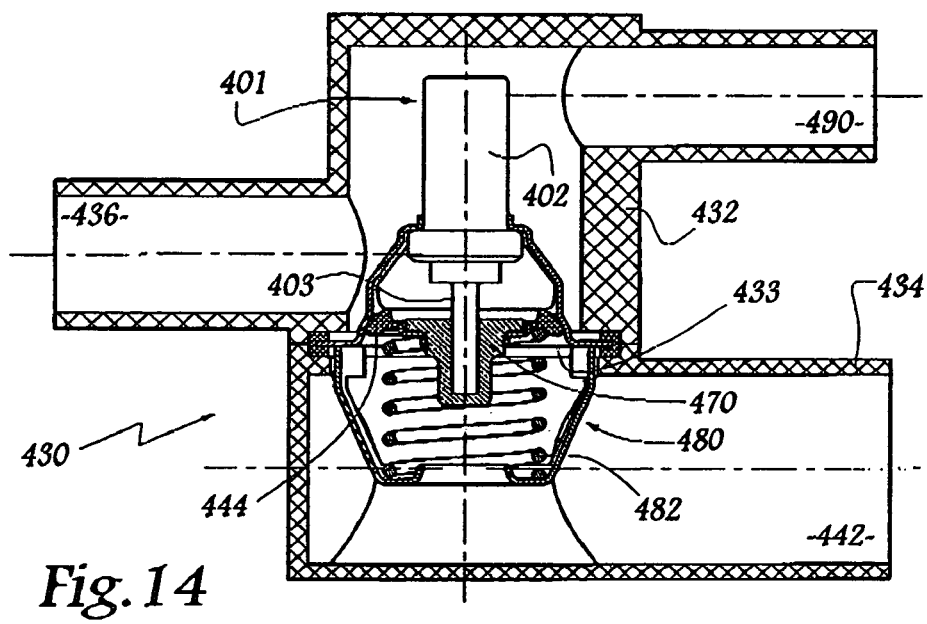

The valve 430 from FIG. 14 differs substantially from the valve 330 owing to the fact that there is no electrical control of its thermostatic element. The element is controlled solely by temperature of water passing through the valve via conduits 436 and 490.

Other configurations and variants of the valves described above are also conceivable, in particular by combining in a single valve production or assembly details described for various valves. For example, flat portions similar to the flat portion 76 of the piston 3 of the valve 30 may be provided for the pistons 103, 203, 303 and 403 of the valves 130, 230, 330 and 430.

A variant (not shown) of the valve 30 from FIGS. 1 to 9 consists in producing the check mechanism 44 and the connecting piece 70 in a single piece. More precisely, in this case, the connecting piece 70 is integral with an interior portion of the check mechanism 44, with these elements being produced from a one-piece part made of metal or a synthetic material. This variant has an advantage of reducing a number of parts of the valve, while the embodiment of FIGS. 1 to 9 allows a pre-existing check mechanism to be used, wherein an interior crown 72 of which may be used as a fitting zone, either for the connecting piece 70, as described for the valve 30, or for the body of a thermostatic element, in other known valve configurations.

Another variant (not shown) of the valve 30 from FIGS. 1 to 9 consists in providing that blind hole 74, which is delimited in the connecting piece 70, has an oblong-shaped transverse section, rather than a strictly circular one. More generally, a profile, in transverse section, of this hole 74 may be proportioned to receive the piston 44 and to allow sliding guidance between the piston and the connecting piece 70, whilst at the same time providing, in one or more zones along its contour, a radial clearance between the piston and wall 74b of the hole 74, so as to delimit between these elements a free space similar to the space 78, i.e. a space facilitating fluid communication between an exterior opening of the hole 74 and the base 74a of this hole 74. In this case, presence of the flat portion 76 along the piston 3 is no longer essential, as this free space prevents a suction effect or trapping of fluid in a manner similar to the flat portion 76, as explained above.

The invention claimed is:

1. A thermostatic valve for a cooling circuit, comprising:
   a main housing defining an inlet orifice for a fluid and at least one outlet orifice for the fluid;
   a check mechanism movable relative to said main housing and suitable for regulating passage of the fluid between said inlet orifice and said at least one outlet orifice;
   a seat for receiving said check mechanism, said seat being stationary relative to said main housing;
   a thermostatic element including
   (i) a body containing an expandable material, said body being stationary relative to said main housing, and
   (ii) a piston movable relative to said body; and
   a connecting piece between said check mechanism and said piston, said connecting piece being fixedly secured to said check mechanism and delimiting a blind recess for receiving said piston, with a base of said blind recess forming a stop for said piston when a difference in pressure on either side of said check mechanism is less than a predetermined value so as to kinematically connect said check mechanism and said piston to each other, and with a wall of said blind recess forming a surface for sliding contact with said piston when this difference in pressure is greater than the predetermined value so as to allow said check mechanism to be displaced relative to said piston in a displacement direction of said piston.

2. The thermostatic valve according to claim 1, wherein said check mechanism defines an interior crown, with said connecting piece being press-fit into said interior crown.

3. The thermostatic valve according to claim 1, wherein said connecting piece is fixedly secured to an interior portion of said check mechanism.

4. The thermostatic valve according to claim 1, further comprising:
a spring for returning said check mechanism toward said seat, with a value of the predetermined pressure being a function of adjustment of said spring.

5. The thermostatic valve according to claim 1, wherein said piston and said connecting piece delimit therebetween a free space for fluid communication between said base of said blind recess and an exterior opening of said blind recess.

6. The thermostatic valve according to claim 5, wherein said free space is partly delimited by a flat portion provided along said piston.

7. The valve according to claim 1, further comprising:
a rigid stirrup, delimiting said seat for receiving said check mechanism, said rigid stirrup being joined to said main housing and to said body of said thermostatic element.

8. The thermostatic valve according to claim 7, further comprising:
a secondary housing tightly connected to said main housing in a region of one of said inlet and outlet orifices, and tightening a flange for connecting said rigid stirrup.

9. The thermostatic valve according to claim 7, further comprising:
a lid tightly connected to said main housing and suitable for connecting a flange of said rigid stirrup to said main housing.

10. The thermostatic valve according to claim 1, wherein said body of said thermostatic element is arranged in said main housing, in a flow path of the fluid between said inlet orifice and said at least one outlet orifice.

11. The thermostatic valve according to claim 1, wherein said main housing delimits a tract for circulation of a fluid other than that which is regulated by said check mechanism, with said body of said thermostatic element being arranged in said main housing, in a path of this other fluid.

12. The thermostatic valve according to claim 1, further comprising:
an electrical heating device including a sheath at least partially immersed in said expandable material of said thermostatic element, and a heating resistor accommodated in said sheath, said electrical heating device being suitable for being connected to an electric power supply; and
an electrical connecting socket suitable for positioning electrical connecting contacts of said heating resistor and being tightly joined to said sheath such that a thermostatic assembly, including said thermostatic element, said electrical heating device and said electrical connecting socket, is in a pre-assembled configuration in which said assembly is capable of being fit in one piece into said main housing.

* * * * *